(12) United States Patent
Godsk et al.

(10) Patent No.: US 7,927,070 B2
(45) Date of Patent: Apr. 19, 2011

(54) PITCH CONTROLLED WIND TURBINE BLADE, A WIND TURBINE AND USE THEREOF

(75) Inventors: Kristian Balschmidt Godsk, København N (DK); Thomas Steiniche Bjertrup Nielsen, Randers (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/014,844

(22) Filed: Jan. 16, 2008

(65) Prior Publication Data

US 2008/0175711 A1 Jul. 24, 2008

Related U.S. Application Data

(63) Continuation of application No. PCT/DK2005/000324, filed on May 17, 2005.

(51) Int. Cl.
*F03B 3/12* (2006.01)
(52) U.S. Cl. .......................................... 416/62; 416/147
(58) Field of Classification Search .................... 416/62, 416/228
See application file for complete search history.

(56) References Cited

U.S. PATENT DOCUMENTS

| | | | |
|---|---|---|---|
| 4,348,155 A * | 9/1982 | Barnes et al. | 416/46 |
| 4,584,486 A | 4/1986 | Quynn et al. | 290/44 |
| 5,788,191 A * | 8/1998 | Wake et al. | 244/199.2 |
| 5,813,625 A * | 9/1998 | Hassan et al. | 244/17.11 |
| 2001/0032907 A1* | 10/2001 | Borchers et al. | 244/123 |
| 2004/0013512 A1* | 1/2004 | Corten | 415/4.1 |
| 2005/0276696 A1* | 12/2005 | LeMieux | 416/61 |

FOREIGN PATENT DOCUMENTS

| | | | |
|---|---|---|---|
| GB | 2186033 A | * | 8/1987 |
| WO | WO 00/15961 | | 3/2000 |
| WO | WO 00/15961 A1 | * | 3/2000 |
| WO | WO 01/16482 | | 3/2001 |
| WO | WO 01/16482 A1 | * | 3/2001 |
| WO | WO 2004/099608 | | 11/2004 |
| WO | WO 2008113350 A2 | * | 9/2008 |

OTHER PUBLICATIONS http://www.windpower.org/en/tour/wtrb/powerreg.htm. Page updated Jun. 1, 2003. Danish Wind Industry Association. Accessed Dec. 21, 2009.*
1999 European Wind Energy Conference Report, pp. 304-308.*
1999 European Wind Energy Conference Report, pp. 304-308 (pages clarified by zoom-in and segmented). 19 total pages.*

(Continued)

*Primary Examiner* — Richard Edgar
(74) *Attorney, Agent, or Firm* — St. Onge Steward Johnston & Reens LLC

(57) ABSTRACT

The invention relates to a pitch controlled wind turbine blade including a pressure surface side and a leeward surface side, where the surfaces establishes a leading edge and a trailing edge. The blade includes a turbulence generating mechanism where the mechanism is placed on the leeward surface sides of the wind turbine blade and at the outer section of the wind turbine blade in direction of the blade tip. The invention further relates to a wind turbine including at least two pitch controlled wind turbine blades and a pitch controlling mechanism for pitching the blades. The blades include a turbulence generating mechanism where the mechanism is placed on the leeward surface sides of the wind turbine blades and at the outer section of the wind turbine blades in direction of the blade tips.

27 Claims, 7 Drawing Sheets

OTHER PUBLICATIONS

Braun K.A. et al: "Noise Reduction by Using Serrated Trailing Edges" European Wind Energy Conference, Oct. 1997, pp. 472-475.
International Search Report, Jan. 18, 2006, 3 pages.
Written opinion of the International Searching Authority, Jan. 18, 2006, 6 pages.
International Report on Patentability, Aug. 8, 2007, 10 pages.

* cited by examiner

PITCH CONTROLLED WIND TURBINE BLADE, A WIND TURBINE AND USE THEREOF

CROSS-REFERENCE TO RELATED APPLICATIONS

The present application is a continuation of pending International patent application PCT/DK2005/000324 filed on May 17, 2005 which designates the United States, the content of which is incorporated herein by reference.

FIELD OF THE INVENTION

The invention relates to a pitch controlled wind turbine blade as specified in the preamble of claim 1, a wind turbine as specified in the preamble of claim 16 and use hereof.

SUMMARY OF THE INVENTION

A wind turbine known in the art comprises a wind turbine tower and a wind turbine nacelle positioned on top of the tower. A wind turbine rotor with three wind turbine blades is connected to the nacelle through a low speed shaft, which extends out of the nacelle front as illustrated on FIG. 1.

In stall controlled wind turbines the rotor blades are usually attached at a fixed angle. The geometry of the rotor blade profile however, is aerodynamically designed to ensure that in high wind speed situations, turbulence is created on the backside of the rotor blade, making it stall. The basic advantage of stall control is that moving parts in the rotor and a complex control system are avoided.

A disadvantage at stall controlled wind turbine blades is the fact, that stalling is a significant noise generating mechanism, when the boundary layer separates from the blade surface. The generated noise is typically high levelled and high frequented e.g. in the kilohertz area.

To prevent early stall at wind speeds that occurs before nominal power is reached, it is known to provide stall controlled blades with vortex generators close to the root of the blades, where the speed of the blades are the lowest. Applying vortex generators create controlled turbulence and may thus delay the boundary layer separation.

Further it is known from WO 00/15961 to provide the blades with vortex generators throughout the entire length of the blades, to prevent premature stalling at high wind speed on the stall controlled blades.

However, blades of a stall controlled wind turbine have to be well designed and strong in order to prevent stall-induced vibrations and to withstand the forces of high wind speeds. The size and especially the weight of stall controlled wind turbine blades are significantly larger than any other type of wind turbine blades. Consequently stall control are not a typical choice in designing large modern wind turbines.

Further, using vortex generators in stall controlled wind turbines result in a large increase in drag during normal operation and also self induced noise from the vortex generators.

An object of the invention is to provide an advantageous aerodynamic blade technique for large modern wind turbines and wind turbine blades.

Especially it is an object of the invention to provide for an advantageous technique for pitch controlled wind turbines and wind turbine blades, in relation to noise emission.

BACKGROUND OF THE INVENTION

The invention provides for a pitch controlled wind turbine blade, characterized in that, said blade comprise turbulence generating means wherein said means are placed on the leeward surface side of said wind turbine blade and at the outer section of said wind turbine blade in direction of the blade tip.

It is advantageous to provide a pitch controlled wind turbine blade with turbulence generating means, in that it makes it possible to continuously optimise the blades angle of attack in relation to power output and noise emission.

Furthermore, the human ear is sensitive to noise in a narrow frequency band. Providing the blade with turbulence generating means broaden the frequency band at which the noise is emitted, making it less irritating to the human ear.

Further the turbulence generating means may transform a part of the generated noises frequency, from low frequency to high frequency. This is advantageous, in that air can much more efficiently absorb high frequency noise than low frequency noise, which thereby reduces the overall noise emission from the blade and thereby from the wind turbine on which the blade is mounted, as perceived by the human ear.

The term "leeward surface sides" may also be understood as the suction side i.e. the side of the blade facing the tower on an upwind wind turbine during normal operation.

In an aspect of the invention, said turbulence generating means are airflow noise reduction means.

Wind turbines produce noise when the blades rotate through the air. It is therefore advantageous to provide the blades with airflow noise reduction means, even though it might increase drag and thereby decrease the wind turbines efficiency marginally.

In an aspect of the invention, said turbulence generating means are placed in an outer section ranging from 60% to 100% of the length of said blade e.g. the outermost third of said wind turbine blade.

The noise emission from a wind turbine blade increases, when the rotation speed of the blade increases; and the speed of blade, relative to the surrounding air, increases towards the tip of the blade. The present range therefore provides for an advantageous placement of the turbulence generating means in relation to noise emission.

In an aspect of the invention, said outer section is subdivided into two or more subsections, and said turbulence generating means is substantially uniform within each of said subsections.

Making the turbulence generating means uniform is advantageous production wise, in that they can be mass-produced, and thereby reducing the cost of the individual turbulence generating means considerably. But to efficiently reduce the noise emission from the blade, it can be advantageous to vary the design or the size of the turbulence generating means throughout the section of the blade at which they are distributed. By subdividing the outer section into two or more subsections in which the turbulence generating means are substantially uniform, an advantageous relation between manufacturing costs and reduction of noise emission is reached.

In an aspect of the invention, the height of said turbulence generating means is of equal extent or is higher closest to the trailing edge of said wind turbine blade, than closest to the leading edge of said wind turbine blade.

Making the turbulence generating means with a constant height or higher at the back as seen from the tip or the root of the blade is advantageous, in that it provides the means with good turbulence generating qualities.

In an aspect of the invention, the highest height of said turbulence generating means is between 0.01% and 5%, preferably between 0.1% and 3% and most preferred between 0.2% and 0.8% of the chord length of said wind turbine blade.

The present height range provides the turbulence generating means with an advantageous relation between noise emission and drag.

In an aspect of the invention, the distance between said turbulence generating means are substantially constant.

Keeping the distance between the turbulence generating means substantially constant is advantageous in that it makes it easy to mount them on a ready made wind turbine blade. Furthermore it can also improve the turbulence generating means efficiency in relation to reducing noise emission.

In an aspect of the invention, said turbulence generating means are placed in a range between 5% and 85%, preferably between 10% and 75% and most preferred between 15% and 60% of the chord length, from the leading edge of said wind turbine blade.

The present range provides for an advantageous placement of the turbulence generating means in relation to noise emission.

In an aspect of the invention, said turbulence generating means are attached to the wind turbine blade individually or as pairs by means of attachment means such as screws, bolts, rivets, welding or preferably adhesive.

It is advantageous to attach the turbulence generating means individually or as pairs, in that it enables the possibility of positioning the means individually for optimal noise reduction.

In an aspect of the invention, said turbulence generating means are attached to the wind turbine blade as part of a string of tape, a coil or a band by means of attachment means such as screws, bolts, rivets, welding or preferably adhesive.

It is advantageous to attach the turbulence generating means to the surface of the blade as part of a string of tape, a coil or a band, in that it provides for a simple and cost efficient way of attaching the means.

In an aspect of the invention, said turbulence generating means are plates extending in an angle between 60° and 120° e.g. orthogonally from the surface of said wind turbine blades leeward surface side.

Designing the turbulence generating means as plates extending from the blades suction surface side in the present angle range, provides for an advantageous design of the turbulence generating means in relation to noise emission.

In an aspect of the invention, said turbulence generating means comprises sides alternately positioned in an angle in relation to the direction of the airflow between 50° and 2°, preferably between 30° and 5° and most preferred between 20° and 10° and −50° and −2°, preferably between −30° and −5° and most preferred between −20° and −10°.

Making the angle of the sides of the turbulence generating means alternately positive and negative in relation to the direction of the incoming airflow, provides for an advantageous design of the turbulence generating means in relation turbulence generation and noise emission.

In an aspect of the invention, said turbulence generating means are formed integrally with the wind turbine blade.

Forming the turbulence generating means integrally with the wind turbine blade e.g. during the manufacturing of the blade is advantageous, in that it provides for a simple and cost efficient way of providing the blade with turbulence generating means.

In an aspect of the invention, said turbulence generating means are vortex generators.

Using vortex generators as means for preventing or minimizing stall are well known within the art of making wind turbine blades, airplane wings and other. A lot of issues regarding production methods, attachment methods and other have therefore already been dealt with, and it is therefore advantageous to make use of these experiences in making turbulence generating means.

In an aspect of the invention, said wind turbine blade comprise at least one pitch controlling unit.

The invention further provides for a wind turbine comprising at least two pitch controlled wind turbine blades and pitch controlling means for pitching said blades characterized in that said blades comprise turbulence generating means wherein said means are placed on the leeward surface sides of said wind turbine blades and at the outer section of said wind turbine blades in direction of the blade tips. Hereby is achieved an advantageous apparatus according to the invention.

In an aspect of the invention, said wind turbine is a variable speed pitch controlled wind turbine.

Variable rotation speeds produces variable noise at variable levels which can be particularly irritating to the human ear. It is therefore advantageous to reduce the sound emission by use of turbulence generating means on the blades in variable speed pitch controlled wind turbine.

The invention also relates to use of pitch controlled wind turbine blades according to any of claims 1 to 15 in connection with a pitch controlled wind turbine according to any of claims 16 to 18 for adjusting blade pitch and noise level.

In a further aspect of the invention the use involves control of said noise level on the basis of noise level measurements by sound measurement means such as microphones.

BRIEF DESCRIPTION OF THE DRAWINGS

The invention will be described in the following with reference to the figures in which FIG. 1. illustrates a large modern wind turbine as seen from the front.

DETAILED DESCRIPTION OF THE INVENTION

Figure 1:
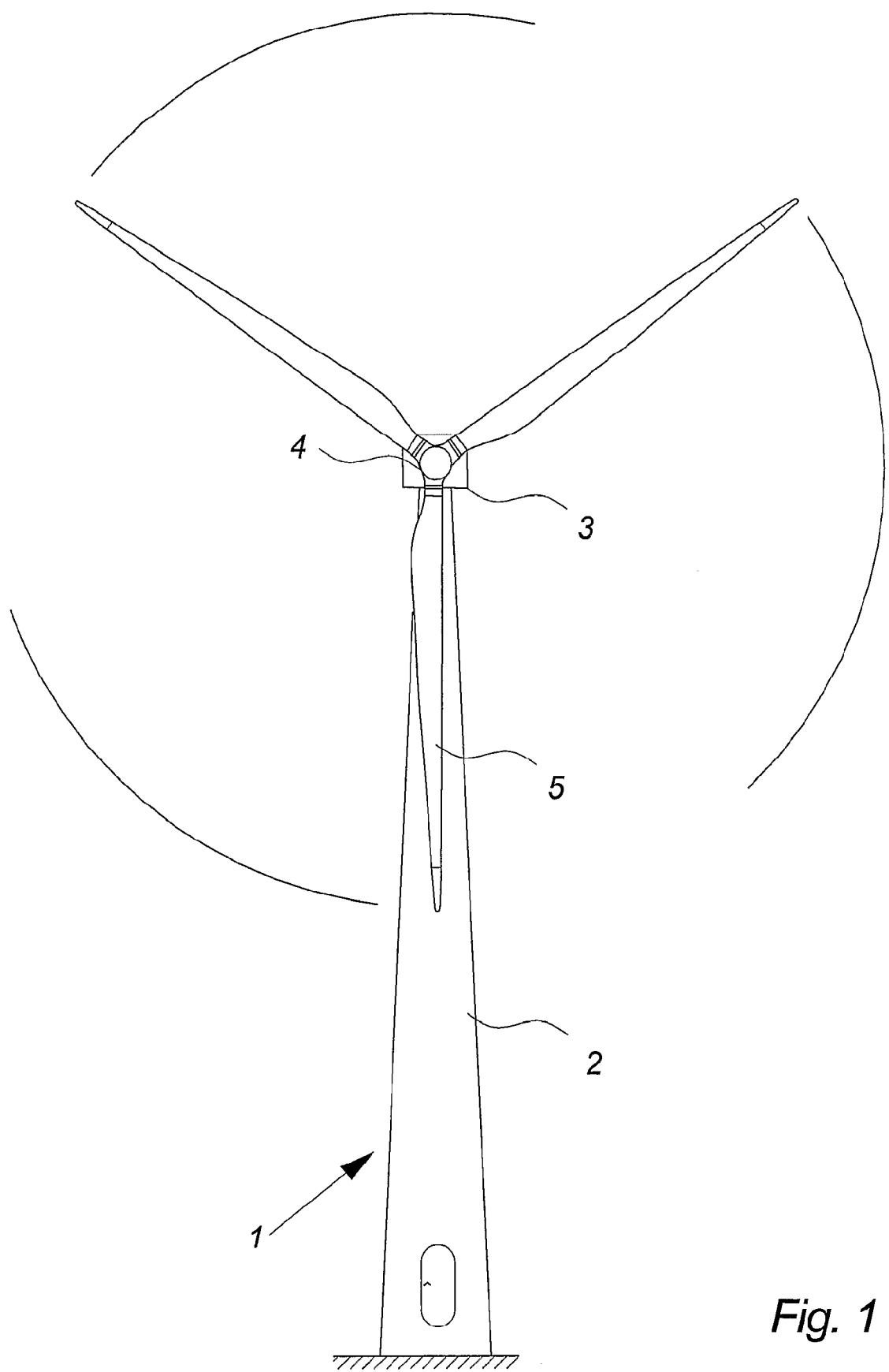

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
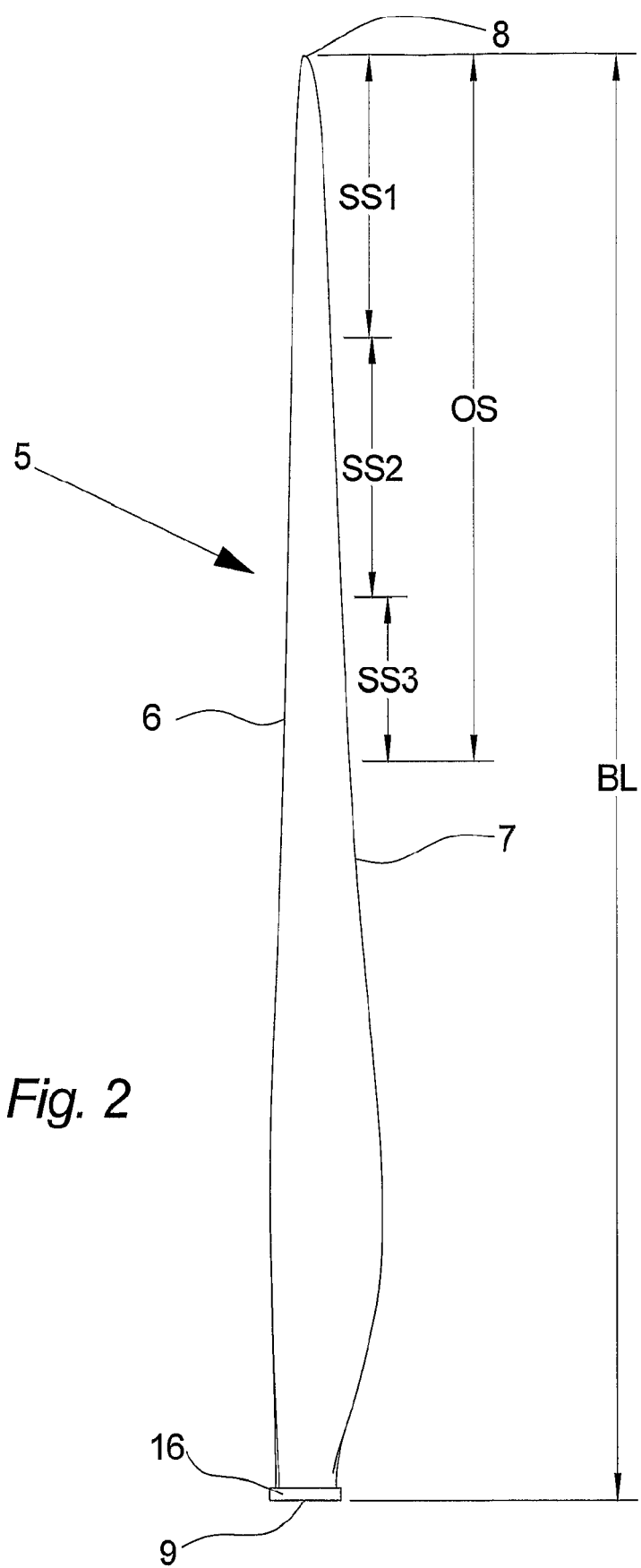
FIG. 2 illustrates a wind turbine blade, as seen from the front.

FIG. 2 illustrates a wind turbine blade 5, as seen from the front/pressure side 14. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

The length of the blade 5 is indicated by BL.

At the root 9 the blade 5 is provided with a pitch controlling unit 16 which could comprise bearings, gear wheel, means for pitching the blade 5 and/or means for attaching the means for pitching the blade 5.

OS indicates the outer section of the blade 5 in this embodiment of the invention, and the outer section OS is further subdivided into subsections 1, 2 and 3 SS1, SS2, SS3. In another embodiment of the invention the outer section OS could be subdivided into another number of subsections e.g. two or four of identical or varying length. The outer section OS constitutes approximately 40% of the blade length BL in this embodiment of the invention i.e. it extends from approximately 60% of the blade length BL to 100% of the blade length BL, as measured from the root 9.

Figure 3:
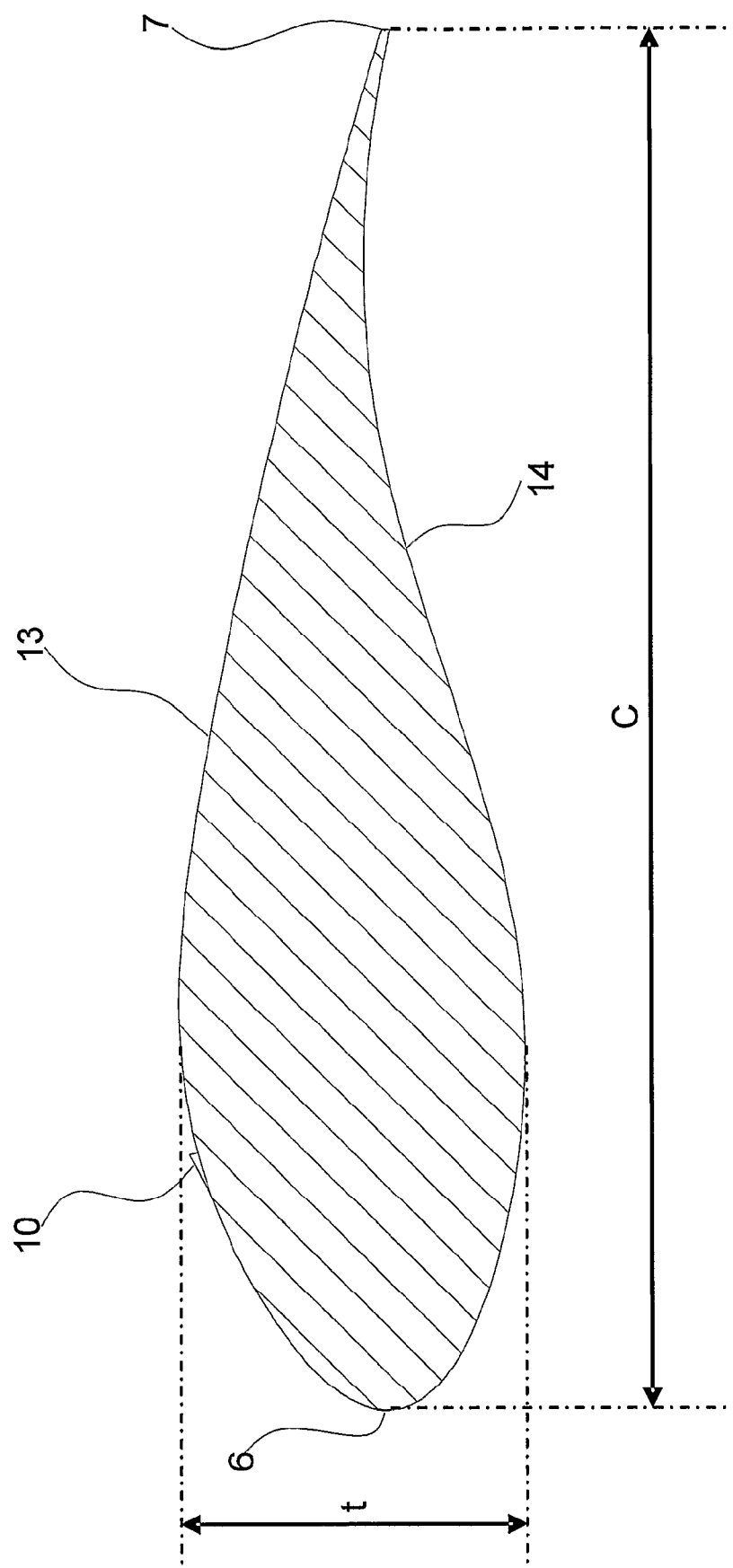
FIG. 3 illustrates a cross-section of a wind turbine blade, as seen from the root of the blade.

FIG. 3 illustrates a cross-section of a wind turbine blade 5, as seen from the root 9 of the blade 5. The blade 5 comprises a suction/leeward side 13, a pressure side 14, a leading edge 6 and a trailing edge 7. The chord length of the blade 5 is illustrated as C and is the distance between the leading edge 6 and the trailing edge 7. The height of the blade 5 is marked as t.

In this embodiment of the invention a turbulence generating means 10 is placed on the leeward side 13 of the blade 5 approximately 20% of the chord length C from the leading edge 6.

Figure 4:
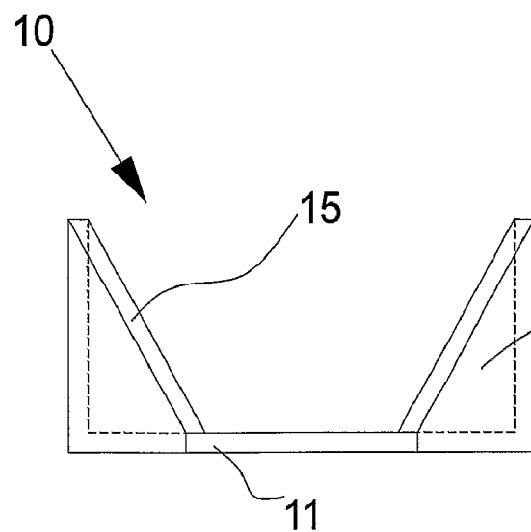
FIG. 4 illustrates an embodiment of a turbulence generating means as seen from the front.

FIG. 4 illustrates an embodiment of a turbulence generating means 10 as seen from the front. In this embodiment the turbulence generating means 10 are made of a single plate where the ends of the plate are bended up, making a fin or plate 15 extend orthogonally from each end of the base 11. Then base 11 is then to be attached to the surface of a wind turbine blade 5 e.g. by adhesive means, screws, bolts, rivets or other suitable attachment means.

In another embodiment of the invention the fins 15 could be individual plates attached to the base 11 by use of adhesive means, welding, screws, bolts or other, or the fins 15 could be attached directly to the wind turbine blade 5 e.g. by use of adhesive means, screws, bolts or other or even made integrally with the blade 5 during the manufacturing of the blade 5.

The fins 15 could also be made integrally with at string of tape, a coil or a band made of e.g. aluminum, stainless steel, plastic or any other material suitable for the purpose. This string of tape, coil or band containing a large number of turbulence generating means 10 would then be attached to the wind turbine blade 5 e.g. by use of adhesive means, screws, bolts or other.

The turbulence generating means 10 could be made from the same type of material as the blade 5 is made of, or it could be made of wood, metal such as aluminum or stainless steel, plastic or any other material suitable for making turbulence generating means 10.

Figure 5:
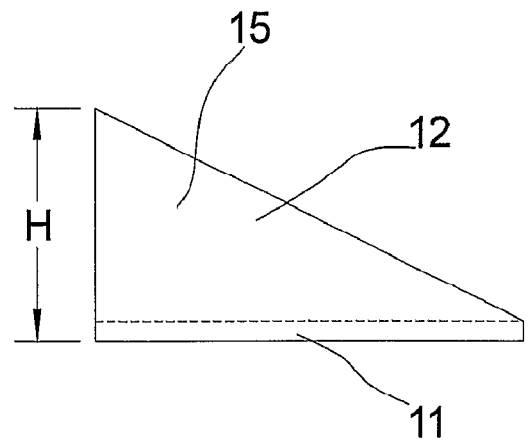
FIG. 5 illustrates the same embodiment of a turbulence generating means as illustrated in FIG. 4, as seen from the side.

FIG. 5 illustrates the same embodiment of a turbulence generating means 10 as illustrated in FIG. 4, as seen from the side. In this embodiment of the invention the fins 15 of the turbulence generating means 10 are triangular, making the fins 15 highest at the back. The highest height of the fins 15 are illustrated as the measurement H.

In another embodiment of the invention the fins 15 could be shaped as a part of a circle or a cone, as a shark fin, rectangular or any other shape suitable for generating turbulence.

Figure 6:
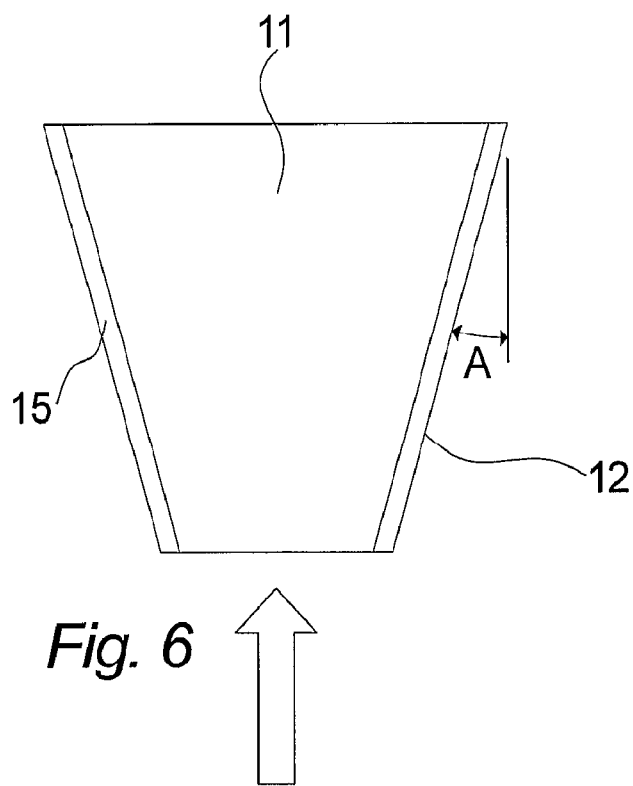
FIG. 6 illustrates the same embodiment of a turbulence generating means as illustrated in FIG. 4, as seen from the top.

FIG. 6 illustrates the same embodiment of a turbulence generating means 10 as illustrated in FIG. 4, as seen from the top. The arrow in front of the turbulence generating means 10 illustrates the airflow direction during normal operation, when the turbulence generating means 10 is mounted on a wind turbine blade 5. As illustrated by the angle A, the sides 12 of the turbulence generating means 10 are positioned in an angle of approximately 16° and −16° relative to the airflow direction. In another embodiment of the invention the sides 12 could be positioned in another angle relative to the airflow direction or the sides 12 could be parallel with the with the airflow direction.

Figure 7:
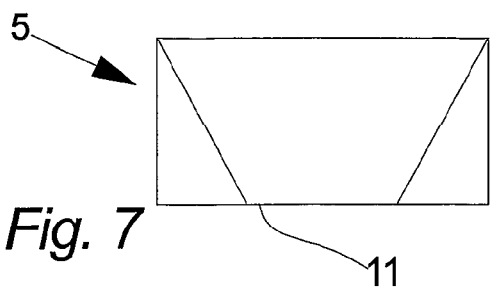
FIG. 7 illustrates an embodiment of a solid turbulence generating means as seen from the front.

FIG. 7 illustrates an embodiment of a solid turbulence generating means 10 as seen from the front. In this embodiment of the invention the turbulence generating means 10 is made as a solid element comprising a base 11, which could be attached to the surface of a wind turbine blade 5 e.g. by adhesive means, screws, bolts, rivets or other suitable attachment means, or the turbulence generating means 10 could be formed integrally with the blade 5 during the manufacturing of the blade 5. In another embodiment of the invention the illustrated turbulence generating means 10 could also be hollow.

As illustrated by the angle A, the sides 12 of the solid turbulence generating means 10 are created in an angle of approximately 15° and −15° relative to the airflow direction. In another embodiment of the invention the sides 12 could be positioned in another angle relative to the airflow direction or the sides 12 could be parallel with the with the airflow direction.

Figure 8:
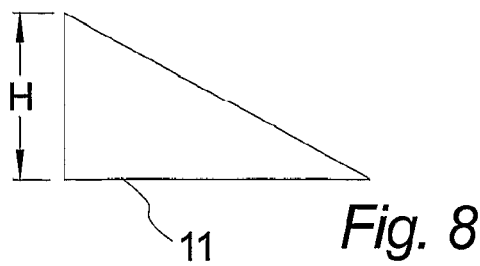
FIG. 8 illustrates the same embodiment of a turbulence generating means as illustrated in FIG. 7, as seen from the side.

FIG. 8 illustrates the same embodiment of a turbulence generating means 10 as illustrated in FIG. 7, as seen from the side.

Figure 9:
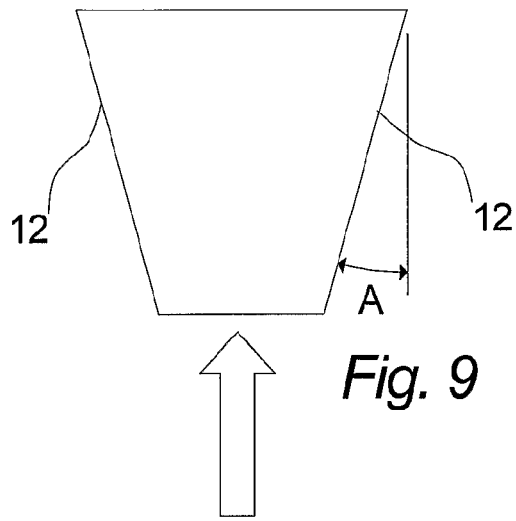
FIG. 9 illustrates the same embodiment of a turbulence generating means as illustrated in FIG. 7, as seen from the top.

FIG. 9 illustrates the same embodiment of a turbulence generating means 10 as illustrated in FIG. 7, as seen from the top.

Figure 10:
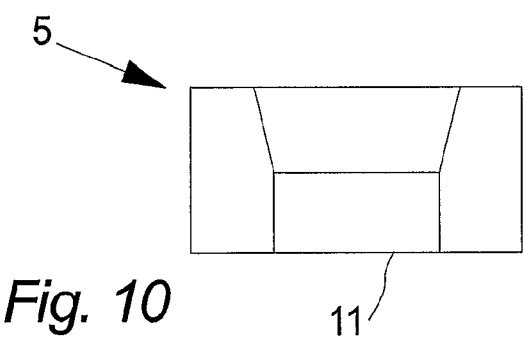
FIG. 10 illustrates another embodiment of a solid turbulence generating means as seen from the front.

FIG. 10 illustrates another embodiment of a solid turbulence generating means 10 as seen from the front.

Figure 11:
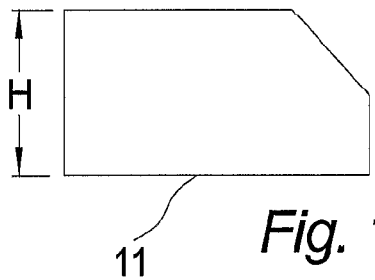
FIG. 11 illustrates the same embodiment of a turbulence generating means as illustrated in FIG. 10, as seen from the side.

FIG. 11 illustrates the same embodiment of a turbulence generating means 10 as illustrated in FIG. 10, as seen from the side. In another embodiment of the invention the front and the back of the means 10 could be equal making the means 10 substantially rectangular or square as seen from the side. This could be the case no matter if the means 10 are solid, plates or other.

Figure 12:
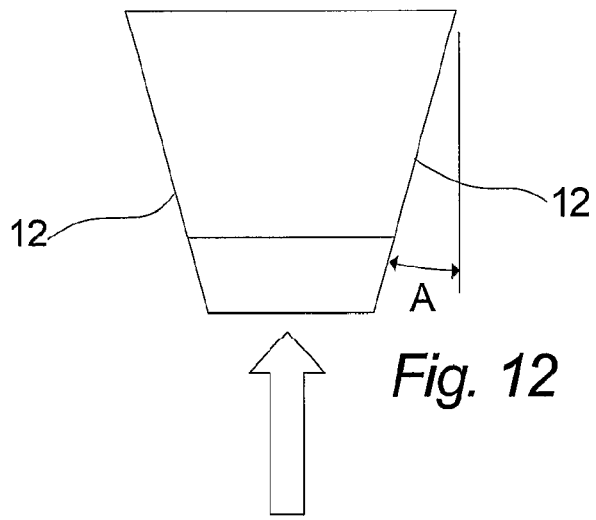
FIG. 12 illustrates the same embodiment of a turbulence generating means as illustrated in FIG. 10, as seen from the top.

FIG. 12 illustrates the same embodiment of a turbulence generating means 10 as illustrated in FIG. 10, as seen from the top.

Figures 13, 14:
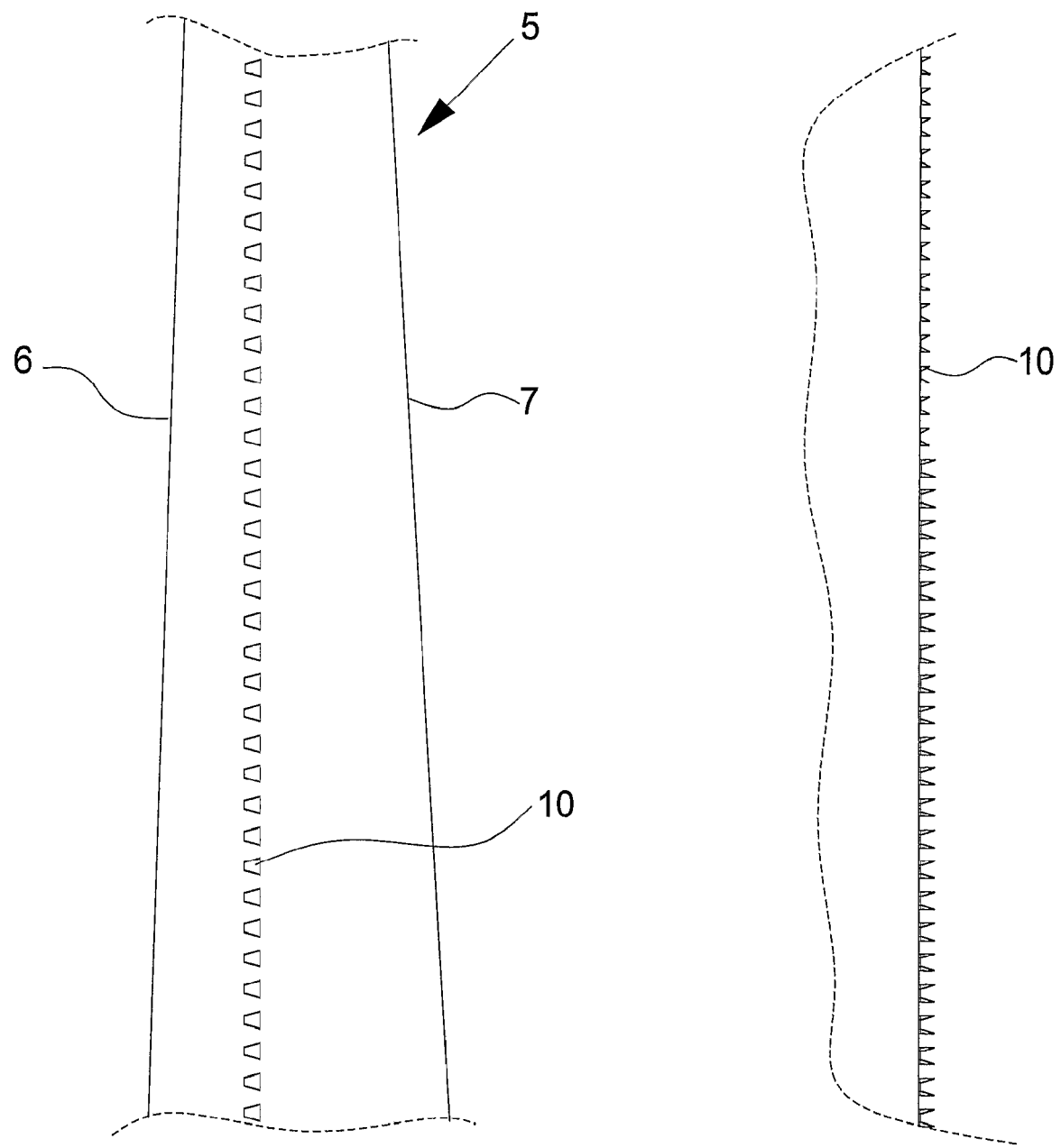
FIG. 13 illustrates a section of wind turbine blade, as seen from the leeward side, comprising a number of turbulence generating means.
FIG. 14 illustrates a section of wind turbine blade, as seen from the leading edge of the blade, comprising a number of turbulence generating means.

FIG. 13 illustrates a section of the outer section of a wind turbine blade 5, as seen from the leeward side, comprising a number of turbulence generating means 10. In this embodiment of the invention the turbulence generating means 10 are positioned on the blade in a straight line, but in another embodiment of the invention they could be positioned within a fixed or varying range from the leading edge 6 or the trailing edge 7 of the blade 5.

The turbulence generating means 10 are positioned in even intervals, but in another embodiment of the invention the turbulence generating means 10 could be positioned with varying distances between adjacent means 10. In another embodiment of the invention the turbulence generating means 10 could also be positioned in more than one row e.g. two or three rows.

In this embodiment of the invention the turbulence generating means 10 are all of the same size and design as seen from the front, but in another embodiment both the size and the design could vary throughout the length of the section in which the turbulence generating means 10 are placed.

FIG. 14 illustrates a section of the outer section of a wind turbine blade 5, as seen from the leading edge 6, comprising a number of turbulence generating means 10. In this embodiment of the invention the outer section in which the turbulence generating means 10 are positioned is subdivided into two subsections, where the turbulence generating means 10 are of different height in the different subsections.

Figure 15:
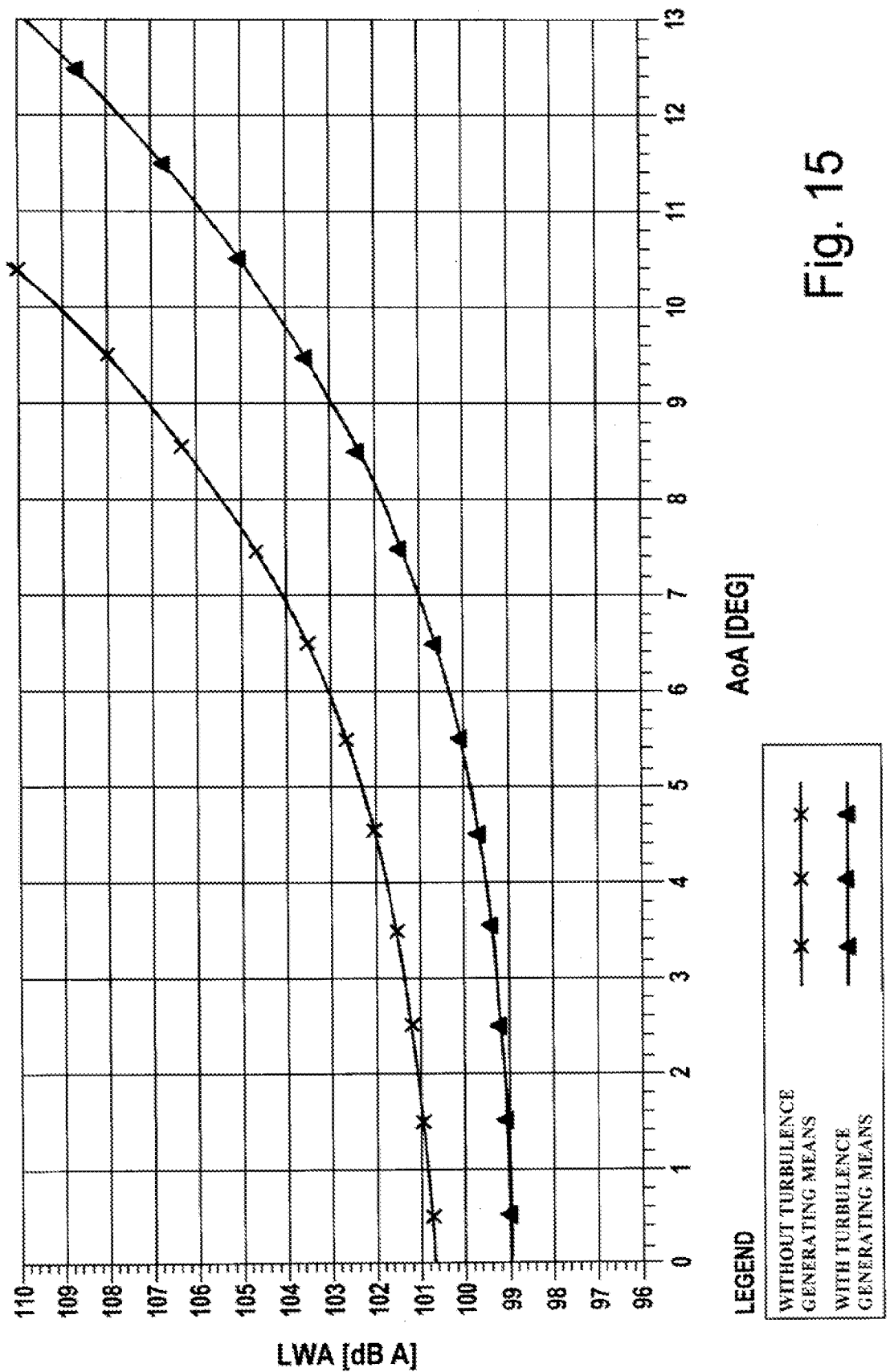
FIG. 15 illustrates a diagram showing the results of a series of tests.

FIG. 15 illustrates a diagram showing the results of a series of tests carried out on a Vestas V90-2MW wind turbine. The axis of ordinate shows the measured A-weighted sound power level in dBA, and the axis of abscissas shows the angle of attack (AoA) measured in degrees.

During normal operation of a wind turbine 1 the blades 5 are rotated relative to the rotor plane. The incoming wind is about orthogonal to the rotor plane, but since the blades 5 are in motion, the effective angle and speed of the incoming wind (i.e. corresponding to steady blades) depends on the rotation speed of the blade. The effective angle is referred to as the angle of attack (AoA).

Ideally the angle of attack would be around 3° to 8°, but when the wind speeds becomes too high the blades are pitched out of the wind to protect the wind turbine. The present diagram therefore illustrates the relation between the total noise output from the wind turbine at different angles of attack for the blades 5 i.e. different wind speeds.

In the diagram, the upper curve illustrates the equation fit of a series of measurements conducted under different weather conditions before any turbulence generating means 10 were mounted on the blades 5.

The lower curve illustrates the combined equation fit of the series of measurements conducted under bad and good weather conditions with turbulence generating means 10 mounted on the blades 5. The two curves illustrates that providing the blades 5 with turbulence generating means 10 reduces the A-weighted sound power level with up to 3 dBA during normal operation, and at a high angle of attack the reduction is up to 5 dBA.

The invention has been exemplified above with reference to specific examples of wind turbine blades 5 and turbulence generating means 10. However, it should be understood that the invention is not limited to the particular examples described above but may be designed and altered in a multitude of varieties within the scope of the invention as specified in the claims.

What is claimed is:

1. A pitch controlled wind turbine blade comprising a pressure surface side and a leeward surface side, said surfaces establishing a leading edge and a trailing edge, characterized in that said blade comprises turbulence generating means wherein said means are placed on said leeward surface side of said wind turbine blade and at the outer section of said wind turbine blade in direction of the blade tip and said turbulence generating means having a fixed shape in relation to said leeward surface side, wherein said wind turbine blade comprises at least one pitch controlling unit, and wherein the highest height of said turbulence generating means is between 0.01% and 5% of a chord length of said wind turbine blade.

2. A wind turbine blade according to claim 1, wherein said turbulence generating means are airflow noise reduction means.

3. A wind turbine blade according to claim 1, wherein said turbulence generating means are placed in an outer section ranging from 60% to 100% of the length of said blade.

4. A wind turbine blade according to claim 3, wherein said outer section is subdivided into two or more subsections, and said turbulence generating means is substantially uniform within each of said subsections.

5. A wind turbine blade according to claim 1, wherein the height of said turbulence generating means is of equal extent or is higher closest to said trailing edge of said wind turbine blade, than closest to said leading edge of said wind turbine blade.

6. A wind turbine blade according to claim 1, wherein the distance between said turbulence generating means are substantially constant.

7. A wind turbine blade according to claim 1, wherein said turbulence generating means are placed in a range between 5% and 85% from said leading edge of said wind turbine blade.

8. A wind turbine blade according to claim 7, wherein said turbulence generating means are placed in a range between 10% and 75% of the chord length, from said leading edge of said wind turbine blade.

9. A wind turbine blade according to claim 8, wherein said turbulence generating means are placed in a range between 15% and 60% of the chord length, from said leading edge of said wind turbine blade.

10. A wind turbine blade according to claim 1, wherein said turbulence generating means are attached to the wind turbine blade individually or as pairs by means of attachment means.

11. A wind turbine blade according to claim 10, wherein said attachment means is selected from a group consisting of screws, bolts, rivets, welding and adhesive.

12. A wind turbine blade according to claim 11, wherein said attachment means is an adhesive.

13. A wind turbine blade according to claim 1, wherein said turbulence generating means are attached to the wind turbine blade as part of a string of tape, a coil or a band by means of attachment means.

14. A wind turbine blade according to claim 13, wherein said attachment means is selected from the group consisting of screws, bolts, rivets, welding and adhesive.

15. A wind turbine blade according to claim 14, wherein said attachment means is an adhesive.

16. A wind turbine blade according to claim 1, wherein said turbulence generating means are plates extending in an angle between 60° and 120° from the surface of said wind turbine blades leeward surface side at said turbulence generating means.

17. A wind turbine blade according to claim 1, wherein said turbulence generating means comprises sides alternately positioned in an angle in relation to the direction of the airflow between 50° and 2° and −50° and −2°.

18. A wind turbine blade according to claim 17, wherein said turbulence generating means comprises sides alternately positioned in an angle in relation to the direction of the airflow between 30° and 5° and −30° and −5°.

19. A wind turbine blade according to claim 18, wherein said turbulence generating means comprises sides alternately positioned in an angle in relation to the direction of the airflow between 20° and 10° and −20° and −10°.

20. A wind turbine blade according to claim 1, wherein said turbulence generating means are formed integrally with the wind turbine blade.

21. A wind turbine blade according to claim 1, wherein said turbulence generating means are vortex generators.

22. A wind turbine blade according to claim 1, wherein the highest height of said turbulence generating means is between 0.1% and 3% of the chord length of said wind turbine blade.

23. A wind turbine blade according to claim 22, wherein the highest height of said turbulence generating means is between 0.2% and 0.8% of the chord length of said wind turbine blade.

24. A wind turbine blade according to claim 1, wherein said turbulence generating means are plates extending orthogonally from the surface of said wind turbine blades leeward surface side at said turbulence generating means.

25. A wind turbine comprising at least two pitch controlled wind turbine blades and pitch controlling means for pitching said blades characterized in that said blades comprise turbulence generating means wherein said means are placed on the leeward surface sides of said wind turbine blades and at the outer section of said wind turbine blades in direction of the blade tips and said turbulence generating means having a fixed shape in relation to said leeward surface side, wherein the highest height of said turbulence generating means is between 0.01% and 5% of a chord length of said wind turbine blades.

26. A wind turbine according to claim 25, wherein said turbulence generating means are vortex generators.

27. A wind turbine according to claim 25, wherein said wind turbine is a variable speed pitch controlled wind turbine.

* * * * *